US012695301B2

(12) United States Patent
Shen et al.

(10) Patent No.: US 12,695,301 B2
(45) Date of Patent: Jul. 28, 2026

(54) COORDINATION METHOD OF ELECTRICITY SUPPLY AND RECIPIENT MARKET DAY-AHEAD SPOT CLEARING CONSIDERING HYDROPOWER ABSORPTION

(71) Applicant: DALIAN UNIVERSITY OF TECHNOLOGY, Dalian (CN)

(72) Inventors: Jianjian Shen, Dalian (CN); Yang Zhang, Dalian (CN); Chuntian Cheng, Dalian (CN); Qihao Zhao, Dalian (CN); Mengfei Xie, Dalian (CN); Zebin Jia, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 329 days.

(21) Appl. No.: 18/682,073

(22) PCT Filed: Apr. 13, 2023

(86) PCT No.: PCT/CN2023/087945
§ 371 (c)(1),
(2) Date: Feb. 7, 2024

(87) PCT Pub. No.: WO2024/212143
PCT Pub. Date: Oct. 17, 2024

(65) Prior Publication Data
US 2025/0226653 A1 Jul. 10, 2025

(51) Int. Cl.
*H02J 3/00* (2026.01)
*G05B 13/04* (2006.01)
*H02J 103/30* (2026.01)

(52) U.S. Cl.
CPC ................ *H02J 3/00* (2013.01); *G05B 13/04* (2013.01); *H02J 2103/30* (2026.01)

(58) Field of Classification Search
CPC .......... H02J 3/00; H02J 2103/30; H02J 3/008; G05B 13/04; G06Q 10/0631; G06Q 50/06; G06Q 40/04; G06Q 10/06
See application file for complete search history.

(56) References Cited

U.S. PATENT DOCUMENTS 12,198,207 B2 * 1/2025 Kiryu ..................... G06Q 50/06
2015/0310366 A1 * 10/2015 Yu ..................... G06Q 10/06312
705/7.22
(Continued)

FOREIGN PATENT DOCUMENTS

CN 105552971 A * 5/2016 ................ H02J 3/48
CN 111861162 A 10/2020
(Continued)

OTHER PUBLICATIONS

Jia, Z., Shen, J., Cheng, C., Zhang, Y. and Lyu, Q., 2022. Optimum day-ahead clearing for high proportion hydropower market considering complex hydraulic connection. International Journal of Electrical Power & Energy Systems, 141, p. 108211. (Year: 2022).*
(Continued)

*Primary Examiner* — Alicia M. Choi
(74) *Attorney, Agent, or Firm* — MUNCY, GEISSLER, OLDS & LOWE, P.C.

(57) ABSTRACT

The invention relates to the fields of electricity market and hydropower dispatching and operation, focusing on a coordination method of electricity supply and recipient market day-ahead spot clearing considering hydropower absorption. The clearing model of minimizing the power purchasing cost is constructed considering the DC transmission plan to determine the boundary conditions of the giant hydropower station generation capacity in the supply market, start-off, ramping, upstream and downstream influence power, and coupling the non-linear characteristics of hydropower and the spillage control requirements, which can optimize the (Continued)

day-ahead spot power of the whole network in the supply market. The update strategy for the DC scheme is proposed, which can dynamically adjust the boundaries of outgoing power and update to the recipient market clearing model based on the spillage of the power station and the control of the grid cross section, and iteratively clear until convergence.

1 Claim, 7 Drawing Sheets

(56)                    References Cited

U.S. PATENT DOCUMENTS

2018/0206034 A1 * 7/2018 Serwy ................. H04R 29/001
2018/0356774 A1 * 12/2018 Wu .................... F24D 19/1009

FOREIGN PATENT DOCUMENTS

CN           113869975 A      12/2021
CN           116757446 A  *  9/2023   ......... G06Q 10/0631
WO     WO2019174040 A1      9/2019

OTHER PUBLICATIONS

Kwon, S., Ntaimo, L. and Gautam, N., 2016. Optimal day-ahead power procurement with renewable energy and demand response. IEEE Transactions on Power Systems, 32(5), pp. 3924-3933. (Year: 2017).*

* cited by examiner

COORDINATION METHOD OF ELECTRICITY SUPPLY AND RECIPIENT MARKET DAY-AHEAD SPOT CLEARING CONSIDERING HYDROPOWER ABSORPTION

TECHNICAL FIELD

The invention relates to the fields of electricity market and hydropower dispatching and operation, focusing on a coordination method of electricity supply and recipient market day-ahead spot clearing considering hydropower absorption.

BACKGROUND

Southwestern provinces with a high proportion of hydropower, such as Yunnan and Sichuan, usually need to send power across provinces and regions to the southern coast and eastern area. Due to the large scale and wide range of transmission, they have become an indispensable part of hydropower absorption at the supply market and power supply at the recipient market. Cross-provincial and cross-regional hydropower transmitted by DC is usually absorbed by multi-party framework agreements. However, along with the continuous improvement of the national multi-level electricity market in recent years, this method is gradually changing to market-based transaction settlement. Southwest hydropower will also change from participating in a single supply electricity market in a province to participating in multiple electricity markets such as supply, recipient, or regional market. Due to the huge difference of different provinces, regions, market rules, and mechanisms, how to connect the supply and recipient markets, and the provincial and regional markets to promote efficient hydropower absorption has become one of the key issues that need to be overcome to promote the current spot market.

The current research on the articulation methods of cross-provincial and cross-regional interconnected markets can be broadly divided into the articulation of inter-provincial spot markets and the coordinated coupling of inter-provincial and intra-provincial markets for clearing. The former supports cross-provincial and cross-regional resource mutual aid by introducing a market interface mechanism, but it lacks joint optimal allocation of inter-provincial and intra-provincial market resources. The latter achieves a wide-area spatial and temporal optimal allocation of resources across provinces and regions by constructing a coordinated market clearing method across provinces and regions. According to the clearing characteristics, the methods can be divided into sequential clearing and joint clearing. In addition, since the high-proportion hydropower system spot clearing modeling and solutions need to consider the large-scale hydropower stations and nonlinear hydraulic characteristics, as well as spatial and temporal hydropower, electric power linkage, and to ensure the accurate matching of the electricity and water of cascaded hydropower stations in the clearing results, so the existing conventional thermal power spot clearing model and solution method is difficult to apply directly. Therefore, how to guarantee market connection and promote hydropower absorption in the cross-provincial market day-ahead spot clearing has become a key issue that must be resolved.

For the above problem, the invention proposes a coordination method of electricity supply and recipient market day-ahead spot clearing considering hydropower absorption. This work is supported by the National Natural Science Foundation of China (52079014). The invention is applied and tested on the improved IEEE 300 node system and the actual project of Yunnan Power Grid. The results show that the invention can complete the high-proportion hydropower market spot clearing of billion kilowatts in about ten minutes, which meets the timeliness requirements of the day-ahead market operation. At the same time, it can effectively connect the results of market clearing with the DC transmission plan, and realize the accurate matching of power and water of the cascaded hydropower stations.

SUMMARY

The technical problem to be solved by the invention is to provide a coordination method of electricity supply and recipient market day-ahead spot clearing considering hydropower absorption. The purpose is to achieve an effective connection between the results of the supply and recipient market and the DC transmission plan, as well as promote the efficient utilization of hydropower resources.

The Technical Solution of the Invention

A coordination method of electricity supply and recipient market day-ahead spot clearing considering hydropower absorption is characterized by the following steps:

(1) Construct a day-ahead spot clearing model for electricity supply and recipient market with the goal of minimizing the total power purchase cost, as shown in Eq. (1). Meanwhile, the constraint set of spillage is introduced to furthest solve the problem caused by spillage of high-proportion hydropower system in the supply market, as shown in Eq. (2).

$$\min \sum_{t \in T} \sum_{i \in I} \left( c_{i,t}^{p} + c_{i,t}^{u} \right) + \sum_{t \in T} \sum_{s \in S} M \left( SD_{s,t}^{+} + SD_{s,t}^{-} \right) \tag{1}$$

$$\begin{cases} P_{i,t}^{in} \le N_{i,t}^{spill}, \left( S_{i,t}^{1} = \text{true} \right) \\ E_i \ge \dfrac{\sum_{t \in T} \left( Q_{i-1,t}^{out} + Q_{i,t}^{local} \right) - \Delta V_i}{W_i}, \left( S^{1} = \text{true} \right) \\ P_{i,t} \le N_{i,t}^{up}, \left( S_{i,t}^{2} = \text{true} \right) \end{cases} \tag{2}$$

Where $$c_{i,t}^{p}$$

is the operating cost of power station i at period t;

$$c_{i,t}^{u}$$

is the start-up cost of power station i at period t; T is the set of time periods; I is the set of power stations participating in the provincial market; M denotes the penalization factor; S is the set of transmission channels;

$$SD_{s,t}^{+}$$

is the surplus capacity of channel s at period t;

$$SD_{s,t}^-$$

is the insufficient capacity of channel s at period t;

$$S_{i,t}^1 \text{ and } S_{i,t}^2$$

respectively represent indicators of spillage status in the first stage and the second stage, where true represents the generation of spillage of power station i at period t, and false represents no spillage. $S^1$ represents the status of whether the spillage adjustment strategy has been implemented, where true means that the strategy has been carried out, and false is the default status at the initial stage;

$$N_{i,t}^{spill}$$

is the upper limit of the bided generation of the plant i at period t calculated by the spilled outflow; $E_i$ is the daily electricity generated by the power station i;

$$Q_{i-1,t}^{out}$$

is the outflow from the upstream power station i−1 at time period t;

$$Q_{i,t}^{local}$$

is the natural streamflow of power station i at time period t; $\Delta V_i$ is the maximum available storage capacity of power station i; $W_i$ is the average daily water consumption rate for power station i;

$$N_{i,t}^{up}$$

is the upper limit of generation for upstream power station i at time period t;

$$P_{i,t}^{in}$$

is the bided generation in the province of power station i at period t; $P_{i,t}$ is the total bided generation of power station i at period t.

(2) Based on the clearing results of the recipient market and combining the relevant technical parameters of the hydropower, the scheduling boundary updating strategy is constructed to update the boundary of the spot trading of the outgoing hydropower. The specific steps are as follows:

Step 1. Prepare the bided generation and start-up and shut-down sequence conditions for outgoing hydropower in the recipient market;

Step 2. Determine the start-up and shut-down schedules of hydropower in each trading session during the day, and update the optimization boundaries of the start-up and shut-down schedules of the outgoing hydropower in the recipient market according to Eq. (3):

$$v_{i,t}^{in} = \begin{cases} 1, & \left(v_{i,t}^{out} = 1, \forall\, t \in T\right) \\ x, & \left(v_{i,t}^{out} = 0, \forall\, t \in T\right) \end{cases} \tag{3}$$

Where $$v_{i,t}^{out}$$

is the start-off state of the power station i at period t in the recipient market, and x represents an unknown start-off state of power station i at period t.

Step 3. Combining the outgoing hydropower start-off schedule and generation profile, the generating and ramping capability boundaries of outgoing hydropower for the corresponding periods are updated according to Eq. (4) and Eq. (5).

$$\begin{cases} \overline{P}_{i,t}^{in} = N_{i,t}^{max} - P_{i,t}^{out}, & \left(\overline{P}_{i,t}^{in} \le \overline{N}_i\right) \\ \underline{P}_{i,t}^{in} = N_{i,t}^{min} - P_{i,t}^{out}, & \left(\underline{P}_{i,t}^{in} \ge 0\right) \end{cases} \tag{4}$$

$$\begin{cases} RU_{i,t}' = RU_i, & -P_{i,t}^{out} + P_{i,t-1}^{out} \\ RD_{i,t}' = RD_i, & -P_{i,t}^{out} + P_{i,t-1}^{out} \end{cases} \tag{5}$$

Where $$\overline{P}_{i,t}^{in} \text{ and } \underline{P}_{i,t}^{in}$$

are the maximum and minimum generation boundaries of power station i in the province at period t, respectively;

$$N_{i,t}^{max} \text{ and } N_{i,t}^{min}$$

are the maximum and minimum technical generation of power station i at the period t, respectively;

$$P_{i,t}^{out}$$

is the outgoing generation of station i at period t; $\overline{N}_i$ is the installed capacity of power station i; $RU'_{i,t}$ and $RD'_{i,t}$ are the maximum upward and downward ramping rate boundaries for power station i at period t, respectively. $RU_i$ and $RD_i$ are the original maximum upward and downward ramping capacities of power station i, respectively.

Step 4. Based on the generation profile of cross-provincial hydropower, the daily power boundary of the outgoing hydropower is updated by Eq. (6) to ensure the precise matching of the power and water volume of each power station.

$$\begin{cases} E_i^{in} \le E_i^{self,max} - \lambda \sum_{t \in T} P_{i,t}^{out}, \, i \in \xi \\ E_i^{in} \le K \times E_{i-1} + E_i^{self,max} - \lambda \sum_{t \in T} P_{i,t}^{out} \end{cases} \quad (6)$$

Where $$E_i^{in}$$

is the bided electricity of power station i in the province;

$$E_i^{self,max},$$

is the maximum daily electricity of the power station i; K is the conversion factor for upstream and downstream daily electricity; $\xi$ is the set of serial numbers for the first stage of cascaded hydropower stations; $\lambda$ is a conversion factor that converts the 15-min average generation to hourly electricity.

Step 5. Update the boundaries related to outgoing hydropower in the day-ahead spot-clearing model for the supply market and organize clearing.

(3) To achieve coordinated clearing of the supply and recipient market as well as dynamic adjustment of outgoing power, an update strategy for the DC transmission plan is constructed taking the spillage adjustment strategy and cross-section power adjustment in supply market as input.

Step 1. Enter the outgoing plan and the results of the clearing of the supply market. Then check the process of outgoing power.

Step 2. Update the boundaries of outgoing power for power stations that fail to reach the target generation based on Eq. (7), to solve the problem that the outgoing plan cannot be completed as promised owing to the insufficient of hydropower generating capability.

$$\overline{E}_i^{out} = E_i^{out} - E_i^{short} \quad (7)$$

Where $$\overline{E}_i^{out}$$

is the maximum outgoing electricity of power station i;

$$E_i^{out}$$

is the planned outgoing electricity of power station i;

$$E_i^{short}$$

is the short electricity compare to the plan of power station i.

Step 3. Update the boundaries of the upstream power station's outgoing plan based on Eq (8) to deal with the reduction in outgoing electricity of the upstream power station due to the spillage adjustment.

$$\overline{P}_{i,t}^{out} = P_{i,t}^{out} - N_{i,t}^{spill}, \, (\forall \, t \in T) \quad (8)$$

Where $$\overline{P}_{i,t}^{out}$$

is the upper limit of the outgoing power of power station i at period t;

$$P_{i,t}^{out}$$

is the planned generation of power station i at period t;

$$N_{i,t}^{spill}$$

is the reduction in outgoing power of power station i at period t due to the spillage adjustment.

Step 4. Update the boundaries of outgoing plan based on the results of the insufficient capacity in supply market, as shown in Eq (9):

$$\overline{P}_{s,t}^{out} = P_{s,t}^{out} - SD_{s,t}^+ + SD_{s,t}^- \quad (9)$$

Where $$\overline{P}_{s,t}^{out}$$

is the upper limit of the outgoing power of channel s at period t;

$$P_{s,t}^{out}$$

is the planning generation of channel s at period t.

Step 5. Update the outgoing boundaries of the recipient market in the day-ahead spot-clearing model and reorganize the clearing, then return to Step 2.

The invention has the following beneficial effects: combining the actual demand for large-scale hydropower consumption across provinces and regions, the invention proposes a coordination method of electricity supply and recipient market day-ahead spot clearing considering hydropower absorption. The method realizes decoupling of supply and recipient market, and constructs an iterative clearing framework taking the cross-provincial DC liaison line as a coordinating factor. The clearing model of minimizing the power purchasing cost is constructed considering the DC transmission plan to determine the boundary conditions of the giant hydropower station generation capacity in the supply market, start-off, ramping, upstream and downstream influence power, and coupling the non-linear characteristics of hydropower and the spillage control requirements, which can optimize the day-ahead spot power of the whole network in the supply market. The update strategy for the DC scheme is proposed, which can dynamically adjust the boundaries of outgoing power and update to the recipient market clearing model based on the spillage of the power station and the control of the grid cross section, and iteratively clear until convergence.

Compared with previous methods, the invention can efficiently deal with the inter-provincial and inter-regional day-ahead spot market connection and the complex hydropower characteristics of high-proportion hydropower system. It can greatly simplify the coupling clearing problem of inter-provincial and inter-regional day-ahead spot market, and promote the efficient consumption of inter-provincial and inter-regional hydropower, which provides a practical method for the inter-provincial and inter-regional consumption of large-scale hydropower in southwestern China.

DESCRIPTION OF DRAWINGS

FIG. 2(*b*) A load balance diagram of the recipient market.

FIG. 3(*b*) A process diagram for the first iteration to calculate the generation and forebay elevation of hydropower station Jinanqiao.

FIG. 5(*b*) A process diagram of the outgoing power of Longkaikou after the first stage of spillage adjustment.

FIG. 6(*b*) A process diagram of the feasible generation interval and generation profile of Longkaikou after the second stage of spillage adjustment.

DETAILED DESCRIPTION

The specific embodiments of the invention are further described below in conjunction with the drawings and technical solutions.

Figure 1:
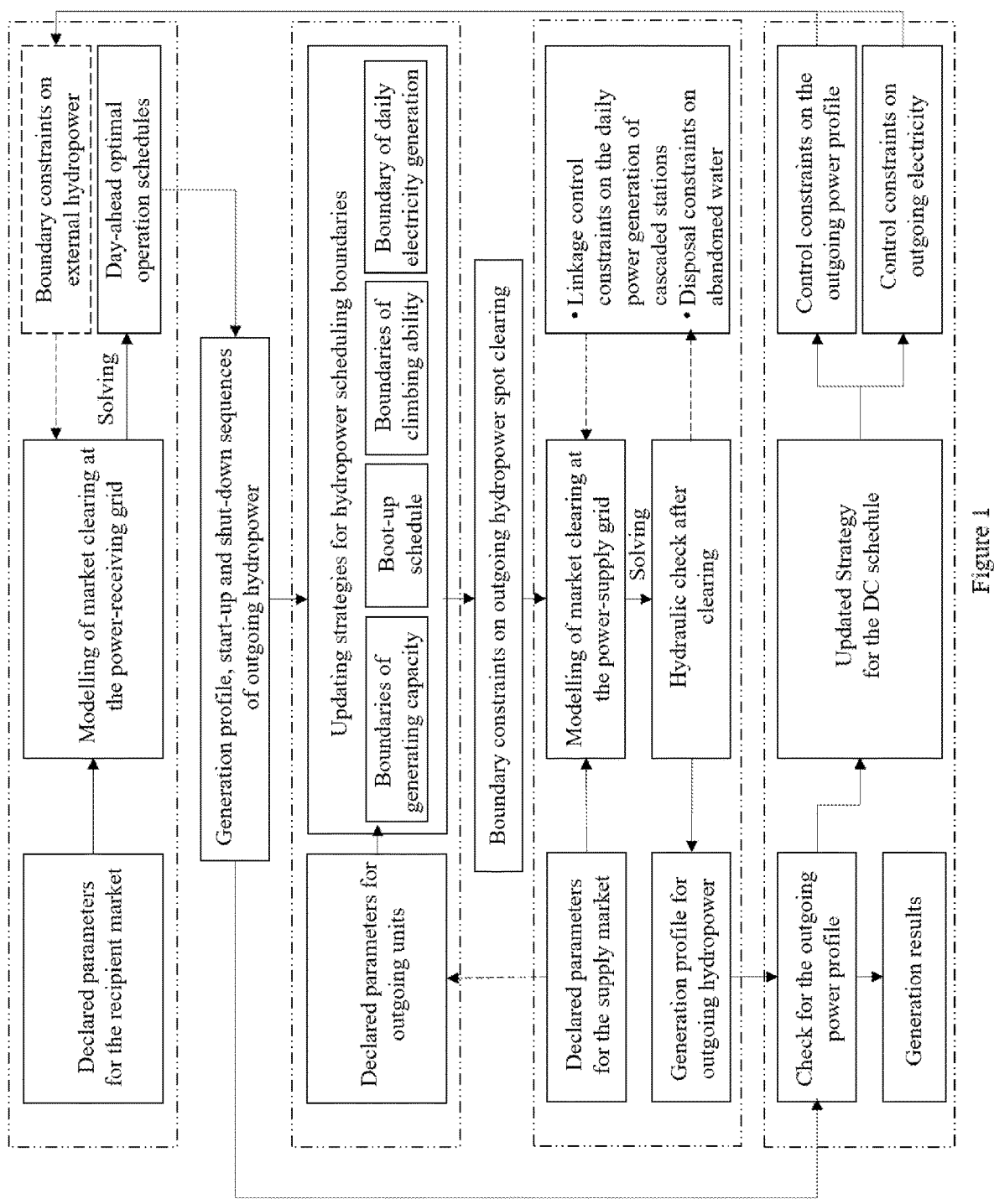
FIG. 1 A framework diagram for the overall solution of the invention.

A framework diagram for the overall solution of the invention is shown in FIG. 1, and the specific implementation steps are as follows:

The invention takes the DC liaison line as the coordinating factor, and combines the relevant characteristics of the supply and recipient markets to construct a day-ahead spot clearing model to minimize the cost of purchasing electricity, respectively, as shown in Equation (10); the constraint set of spillages is introduced to furthest solve the problem caused by spilled water of high-proportion hydropower system in the supply market, as shown in Equation (11).

$$\min \sum_{t \in T} \sum_{i \in I} \left(c_{i,t}^p + c_{i,t}^u\right) + \sum_{t \in T} \sum_{s \in S} M\left(SD_{s,t}^+ + SD_{s,t}^-\right) \quad (10)$$

-continued $$\begin{cases} P_{i,t}^{in} \le N_{i,t}^{spill}, \left(S_{i,t}^1 = \text{true}\right) \\ E_i \ge \dfrac{\sum_{t \in T}\left(Q_{i-1,t}^{out} + Q_{i,t}^{local}\right) - \Delta V_i}{W_i}, \left(S^1 = \text{true}\right) \\ P_{i,t} \le N_{i,t}^{up}, \left(S_{i,t}^2 = \text{true}\right) \end{cases} \quad (11)$$

Where $$c_{i,t}^p$$

is the operating cost of power station i at period t;

$$c_{i,t}^u$$

is the start-up cost of power station i at period t; T is the set of time periods; I is the set of power stations participating in the provincial market; M denotes the penalization factor; S is the set of transmission channels;

$$SD_{s,t}^+$$

is the surplus capacity of channel s at period t;

$$SD_{s,t}^-$$

is the insufficient capacity of channel s at period t;

$$S_{i,t}^1 \text{ and } S_t^2$$

respectively represent indicators of spillage status in the first stage and the second stage, where true represents the generation of spillage of power station i at period t, and false represents no spillage. $S^1$ represents the status of whether the spillage adjustment strategy has been implemented, where true means that the strategy has been carried out, and false is the default status at the initial stage;

$$N_{i,t}^{spill}$$

is the upper limit of the bided generation of the plant i at period t calculated by the spilled outflow; $E_i$ is the daily electricity generated by the power station i;

$$Q_{i-1,t}^{out}$$

is the outflow from the upstream power station i−1 at time period t;

$$Q_{i,t}^{local}$$

is the natural streamflow of power station i at time period t; $\Delta V_i$ is the maximum available storage capacity of power station i; $W_i$ is the average daily water consumption rate for power station i;

$$N_{i,t}^{up}$$

is the upper limit of generation for upstream power station i at time period t;

$$P_{i,t}^{in}$$

is the bided generation in the province of power station i at period t; $P_{i,t}$ is the total bided generation of power station i at period t.

The coordinated clearing of the supply and recipient market is a two-layer optimization problem to ensure the effective articulation of the clearing results of the two markets. The following section combines the characteristics of the high-proportion hydropower market at the sending end, and iteratively updates the market boundaries through the hydropower scheduling boundary updating strategy and the DC plan updating strategy, so as to realize the effective articulation of the spot clearing results and the inter-provincial DC transmission plan, and safeguard the reasonableness of the multi-market synergistic clearing.

To ensure the effective articulation of the intra-provincial and outgoing hydropower generation schedules, the invention constructs an updating strategy for hydropower scheduling boundary. The spot trading boundaries are updated based on the bided generation of hydropower stations that transmit power cross-provincial in the recipient market, the status of start-off, and its own relevant technical parameters. Based on the status of start-off of hydropower stations in the recipient market in each trading session during the day, the optimization boundary of the start-off schedule of hydropower stations in the supply market is updated according to equation (12):

$$v_{i,t}^{in} = \begin{cases} 1, & \left(v_{i,t}^{out} = 1, \forall t \in T\right) \\ x, & \left(v_{i,t}^{out} = 0, \forall t \in T\right) \end{cases} \tag{12}$$

Where $$v_{i,t}^{out}$$

is the start-off state of the power station i at period t in the recipient market, and x represents an unknown start-off state of power station i at period t.

Combining the outgoing hydropower start-off schedule and generation profile, the generating and ramping capability boundaries of outgoing hydropower for the corresponding periods are updated according to Eq. (13) and Eq. (14):

$$\begin{cases} \overline{P}_{i,t}^{in} = N_{i,t}^{max} - P_{i,t}^{out}, \left(\overline{P}_{i,t}^{in} \le \overline{N}_i\right) \\ \underline{P}_{i,t}^{w} = N_{i,t}^{min} - P_{i,t}^{out}, \left(\underline{P}_{i,t}^{in} \ge 0\right) \end{cases} \tag{13}$$

$$\begin{cases} RU_{i,t}' = RU_i - P_{i,t}^{out} + P_{i,t-1}^{out} \\ RD_{i,t}' = RD_i - P_{i,t}^{out} + P_{i,t-1}^{out} \end{cases} \tag{14}$$

Where $$\overline{P}_{i,t}^{in} \text{ and } \underline{P}_{i,t}^{in}$$

are the maximum and minimum generation boundaries of power station i in the province at period t, respectively;

$$N_{i,t}^{max} \text{ and } N_{i,t}^{min}$$

are the maximum and minimum technical generation of power station i at the period t, respectively;

$$P_{i,t}^{out},$$

is the outgoing generation of station i at period t; $\overline{N}_i$ is the installed capacity of power station i; $RU'_{i,t}$ and $RD'_{i,t}$ are the maximum upward and downward climb rate boundaries for power station i at moment t, respectively; $RU_i$ and $RD_i$ are the original maximum upward and downward ramping capacities of power station i, respectively.

Based on the generation profile of cross-provincial hydropower, the daily power boundary of the outgoing hydropower is updated by Eq. (15) to ensure the precise matching of the power and water volume of each power station.

$$\begin{cases} E_i^{in} \le E_i^{self,max} - \lambda \sum_{t \in T} P_{i,t}^{out}, i \in \xi \\ E_i^{in} \le K \times E_{i-1} + E_i^{self,max} - \lambda \sum_{t \in T} P_{i,t}^{out} \end{cases} \tag{15}$$

Where $$E_i^{in}$$

is the bided electricity of power station i in the province;

$$E_i^{self,max}$$

is the maximum daily electricity of the power station i; K is the conversion factor for upstream and downstream daily electricity; $\xi$ is the set of serial numbers for the first stage of cascaded hydropower plants; $\lambda$ is a conversion factor that converts the 15-min average generation to hourly electricity.

Update the boundaries related to outgoing hydropower in the day-ahead spot-clearing model for the supply market and organize clearing based on the above calculations.

In order to guarantee the smooth execution of the DC transmission plan and coordinate the demand for power purchase and sale in the supply and recipient market, the invention constructs a DC plan updating strategy, which dynamically adjusts the outgoing power process by taking the demand for spillage adjustment and cross-section power adjustment in the sending end of market as an input condition, and realizes the synergistic clearing of the supply and recipient market.

The outgoing processes are checked based on the outgoing plan and the results of clearing at the sending end of market. Update the boundaries of outgoing power for power stations that fail to reach the target generation based on Eq. (16), to solve the problem that the outgoing plan cannot be completed as promised owing to the insufficient of hydropower generating capability.

$$\overline{E}_i^{out} = E_i^{out} - E_i^{short} \qquad (16)$$

Where $$\overline{E}_i^{out}$$

is the maximum outgoing electricity of power station i;

$$E_i^{out}$$

is the planned outgoing electricity of power station i;

$$E_i^{short}$$

is the short electricity compare to the plan of power station i.

Update the boundaries of the upstream power station's outgoing plan based on Eq (17) to deal with the reduction in outgoing electricity of the upstream power station due to the spillage adjustment.

$$\overline{P}_{i,t}^{out} = P_{i,t}^{out} - N_{i,t}^{spill}, (\forall\, t \in T) \qquad (17)$$

Where $$\overline{P}_{i,t}^{out}$$

is the upper limit of the transmitted generation of power station i at period t;

$$P_{i,t}^{out}$$

is the planning generation of power station i at period t;

$$N_{i,t}^{spill}$$

is the reduction in transmitted generation of power station i at period t due to the spillage adjustment strategy.

Update the boundaries of outgoing plan based on the results of the insufficient capacity in supply market, as shown in Eq (18):

$$\overline{P}_{s,t}^{out} = P_{s,t}^{out} - SD_{s,t}^{+} + SD_{s,t}^{-} \qquad (18)$$

Where $$\overline{P}_{s,t}^{out}$$

is the upper limit of the transmitted generation of channel s at period t;

$$P_{s,t}^{out}$$

is the planning generation of channel s at period t.

Update the transmission boundaries of the recipient market in the day-ahead spot clearing model and reorganize the clearing.

After the clearing of the recipient market, the cross-provincial transmission process of other stations may be affected, so the hydropower scheduling boundary update strategy is re-executed and the clearing in the recipient market is organized until convergence.

Yunnan power grid and the improved IEEE300 node test system are used as the supply and recipient markets for analysis. There are 142 hydropower and thermal power plants (some of them are virtual power plants), of which the installed hydropower capacity accounts for about 85%, 14 hydropower plants, such as Wunonglong, Lidi, Huangdeng and Miaowei, participate in the trading of the supply and recipient markets at the same time. The recipient market simulates a single thermal power system, including 64 thermal power plants with a total installed capacity of 15,240 MW, and accepts external hydropower. The trading cycle is 24 h, and the time period is 15 min. The actual load and inflow data of Yunnan are used, and the generation of wind and solar power stations is deducted from the load. The node load is determined by the typical daily proportional allocation. 1,452 nodes above 220 kV and 149 typical cross-sections are taken into consideration. The staircase bidding curve is adopted, with a total of 5 segments. The quotation of outgoing power in the supply and recipient market is shown in Table 1.

TABLE 1

| | | Quotation parameters for power generators | | | | | | | | | |
| Power station | Whether or not to deliver | Declared tariff for each segment (yuan/MWh) | | | | | | | | | |
| | | Supply market | | | | | Recipient market | | | | |
| | | First | Second | Third | Fourth | Fifth | First | Second | Third | Fourth | Fifth |
| Wunonglong | Yes | 105 | 123.88 | 142.75 | 161.63 | 180.5 | 145 | 168.75 | 192.5 | 216.25 | 240 |
| Lidi | Yes | 121 | 136 | 151 | 166 | 181 | 147 | 175.25 | 203.5 | 231.75 | 260 |
| Huangdeng | Yes | 79.5 | 94.5 | 109.5 | 124.55 | 139.5 | 141 | 160.75 | 180.5 | 200.25 | 220 |
| Dahuaqiao | Yes | 85 | 100 | 115 | 130 | 145 | 142 | 163 | 184 | 205 | 226 |
| Miaowei | Yes | 107.5 | 131 | 154.5 | 178 | 201.5 | 140 | 163.75 | 187.5 | 211.25 | 235 |
| Gongguoqiao | No | 75 | 86.75 | 98.5 | 110.25 | 122 | — | — | — | — | — |
| Xiaowan | Yes | 111.6 | 130.2 | 148.8 | 167.4 | 186 | 130 | 150 | 170 | 190 | 210 |
| Manwan | No | 94.8 | 110.6 | 126.4 | 142.2 | 158 | — | — | — | — | — |
| Dachaoshan | No | 78 | 91 | 104 | 117 | 130 | — | — | — | — | — |
| Nuozhadu | Yes | 99.5 | 124.5 | 149.5 | 174.5 | 199.5 | 145 | 174.75 | 204.5 | 234.25 | 264 |
| Jinghong | Yes | 89.4 | 103.3 | 117.2 | 131.1 | 145 | 135 | 156.5 | 178 | 199.5 | 221 |
| Liyuan | Yes | 90.5 | 105.5 | 120.5 | 135.5 | 150.5 | 116 | 134.75 | 153.5 | 172.25 | 191 |
| Ahai | Yes | 104 | 122 | 140 | 158 | 176 | 131 | 152.25 | 173.5 | 194.75 | 216 |
| Jin'anqiao | Yes | 90 | 120 | 150 | 180 | 210 | 125 | 143.75 | 162.5 | 181.25 | 200 |
| Longkaikou | Yes | 72 | 86 | 100 | 114 | 128 | 142 | 160.25 | 178.5 | 196.75 | 215 |
| Ludila | Yes | 70 | 82 | 94 | 106 | 118 | 138 | 161 | 184 | 207 | 230 |
| Guanyinyan | Yes | 128 | 143 | 158 | 173 | 188 | 145 | 162 | 179 | 196 | 213 |

The clearing results are obtained after the optimization calculation. The load balance situation of the whole network, hydropower resources utilization and the convergence effect of the market clearing results and DC transmission plan are analyzed in the following text.

Figure 2A:
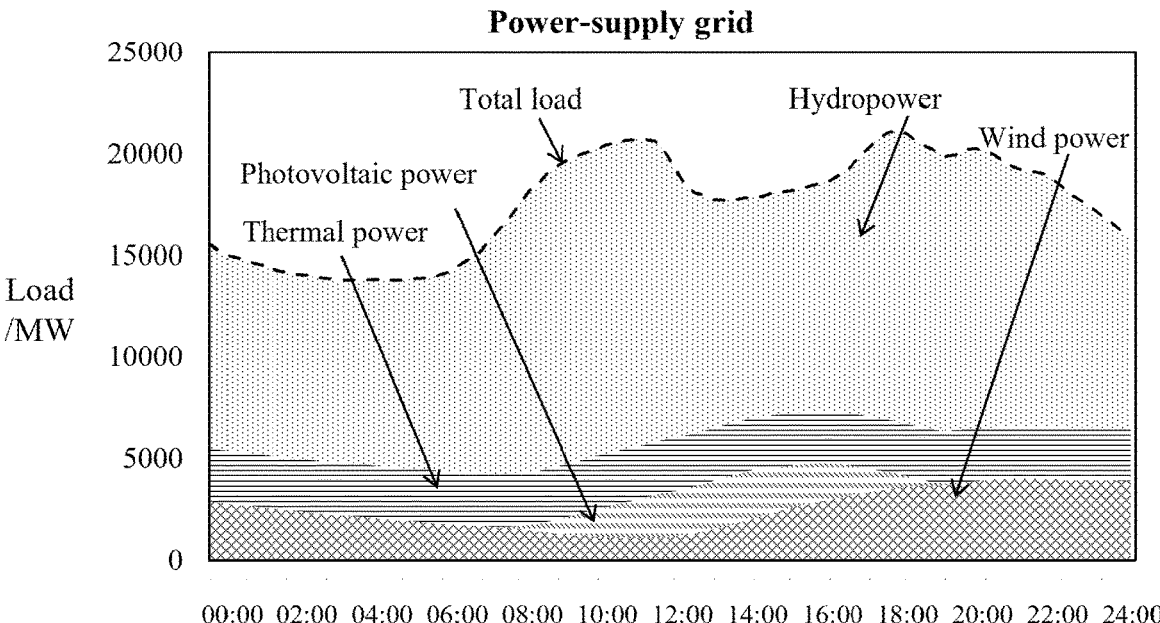
FIG. 2(*a*) A load balance diagram of the supply market.
Figure 2B:
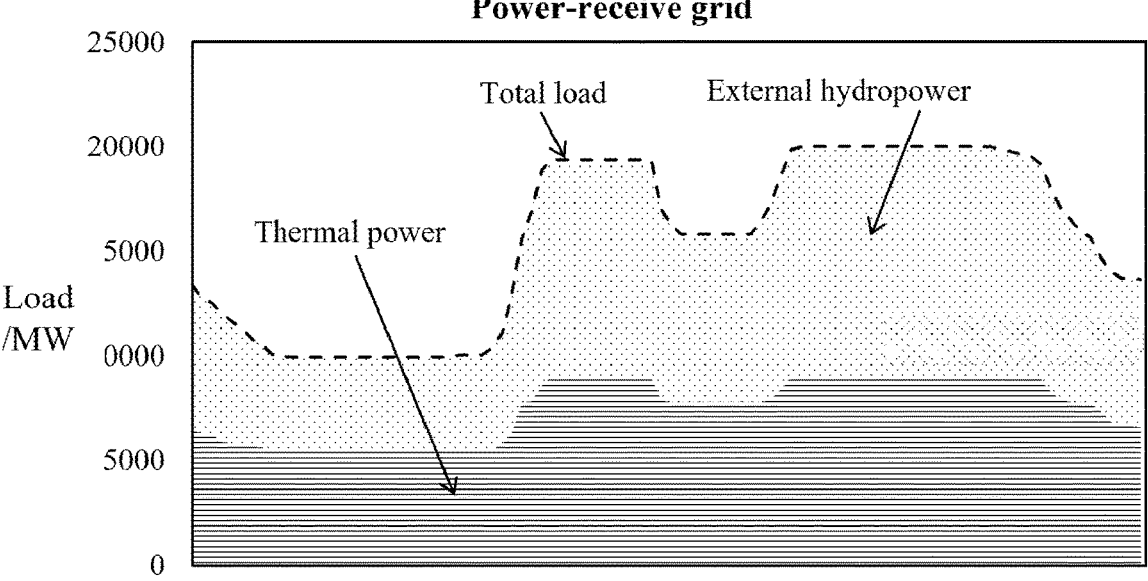

Load balance of the whole network: FIG. 2(a)~ FIG. 2(b) shows the load balance diagrams of the grid at the sending and receiving ends, from which it can be clearly seen that the whole network power and electricity balance is realized in the supply and recipient markets in all periods during the day. In addition, as the price of the outgoing hydropower is generally lower, it wins more generation in the whole trading session and takes up about 50% of the power supply in the recipient market.

Figure 3A:
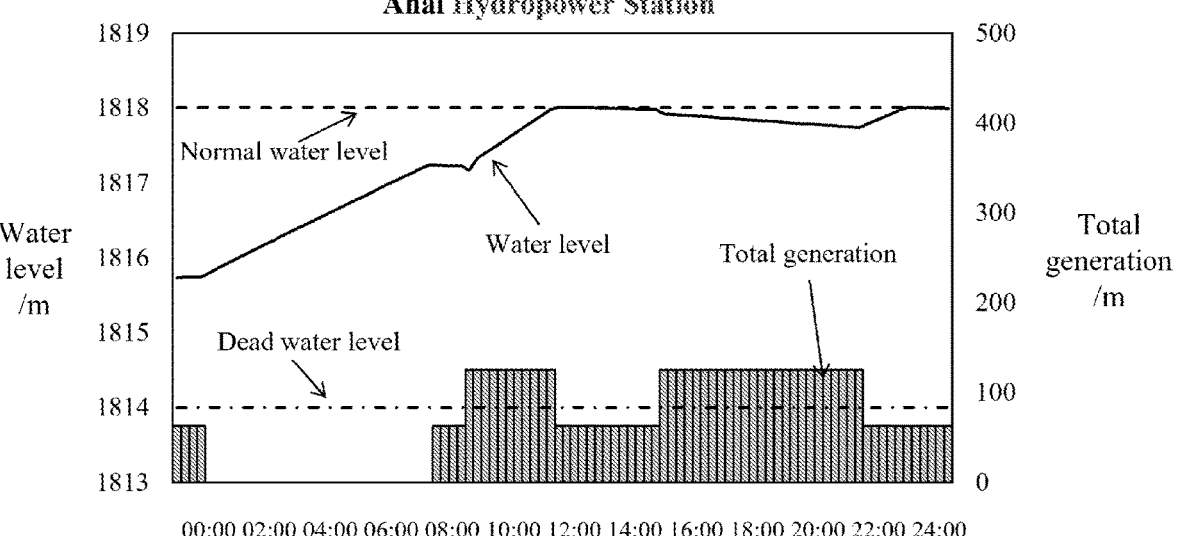
FIG. 3(*a*) A process diagram for the first iteration to calculate the generation and forebay elevation of hydropower station Ahai.
Figure 3B:
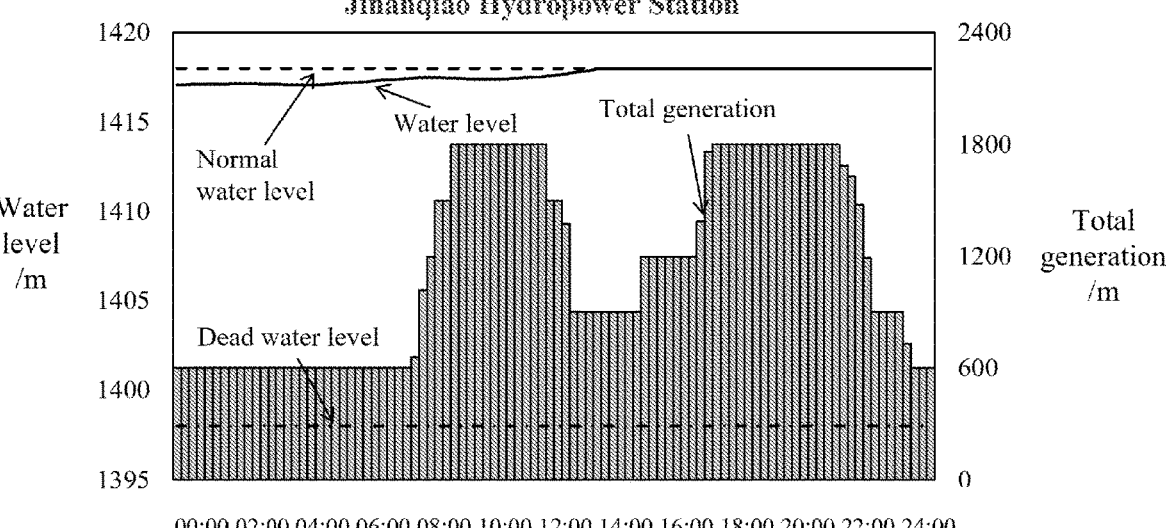

Utilization of hydropower resources: Table 2 shows the bided power obtained from the first round of iterative calculations, and FIG. 3(a)~FIG. 3(b) shows the profiles of generation and forebay elevation of power stations in the first round of iterative calculations. It can be clearly seen that the proportion of outgoing power from each power station varies, and the overall outgoing power accounts for about 56% of the total power generation. In addition, due to the introduction of the daily power linkage control constraints of the cascaded power stations in the clearing model, the mismatch of the bided generation of the upstream and downstream power stations can be effectively avoided, which fully ensures that the generation schedules in the province and the outgoing schedules will be implemented as promised. However, spillage adjustment is not considered at the current stage, and some power stations with poor regulation capacity have competitive spillages, with a total spillage of about 148.486 million m³, of which Ahai Power Station has a spillage of 69.172 million m³, accounting for about half of the total spillage. Specifically, Lidi is a daily regulation power station with poor regulation capacity, and due to its high price and few bided power, the forebay elevation of the reservoir continued to rise to the normal high water level, so it produced spillage in some periods. As for Ahai and Jin'anqiao in the downstream, although the price is low and the bided power is high, Liyuan in their upstream releases too much water, coupled with their poor regulating capacity and high initial water level, resulting in the reservoir water level rapidly reaching the upper limit and generating a large amount of spillage in the subsequent period. Ludila offered a low price, and the bided power is close to the maximum generation at all the periods. The bided power of Guanyinyan is relatively small. Due to the limited regulation capacity, it cannot completely save the inflow, and produced spillage at the end of the trading session.

TABLE 2

| | First iteration of calculating winning bids for outgoing power stations | | | |
| Power station | Retained power/ MWh | Outgoing power/ MWh | Proportion of outward transportation (%) | Disposed water volume/ten thousand m³ |
| Wunonglong | 743.3 | 5251.3 | 87.6% | |
| Lidi | 0 | 1625 | 100% | 257.7 |
| Huangdeng | 19657.9 | 10075.6 | 33.9% | |
| Dahuaqiao | 8543.6 | 3881.9 | 31.2% | |
| Miaowei | 1154.1 | 5728.1 | 83.2% | |
| Xiaowan | 0 | 29701.1 | 100% | |
| Nuozhadu | 13465.1 | 25448.2 | 65.4% | |
| Jinghong | 17985.6 | 13272.1 | 42.5% | |
| Liyuan | 18239.7 | 23232.4 | 56% | |
| Ahai | 2255.2 | 13148.9 | 85.4% | 6917.2 |
| Jin'anqiao | 5821.5 | 21782.2 | 78.9% | 2822.9 |
| Longkaikou | 23975.4 | 11332.8 | 32.1% | |
| Ludila | 37796.1 | 9631.9 | 20.3% | |
| Guanyinyan | 0 | 18821.4 | 100% | 4820.7 |
| total | 149637.5 | 192932.9 | 56.3% | 14848.6 |

Figure 4A:
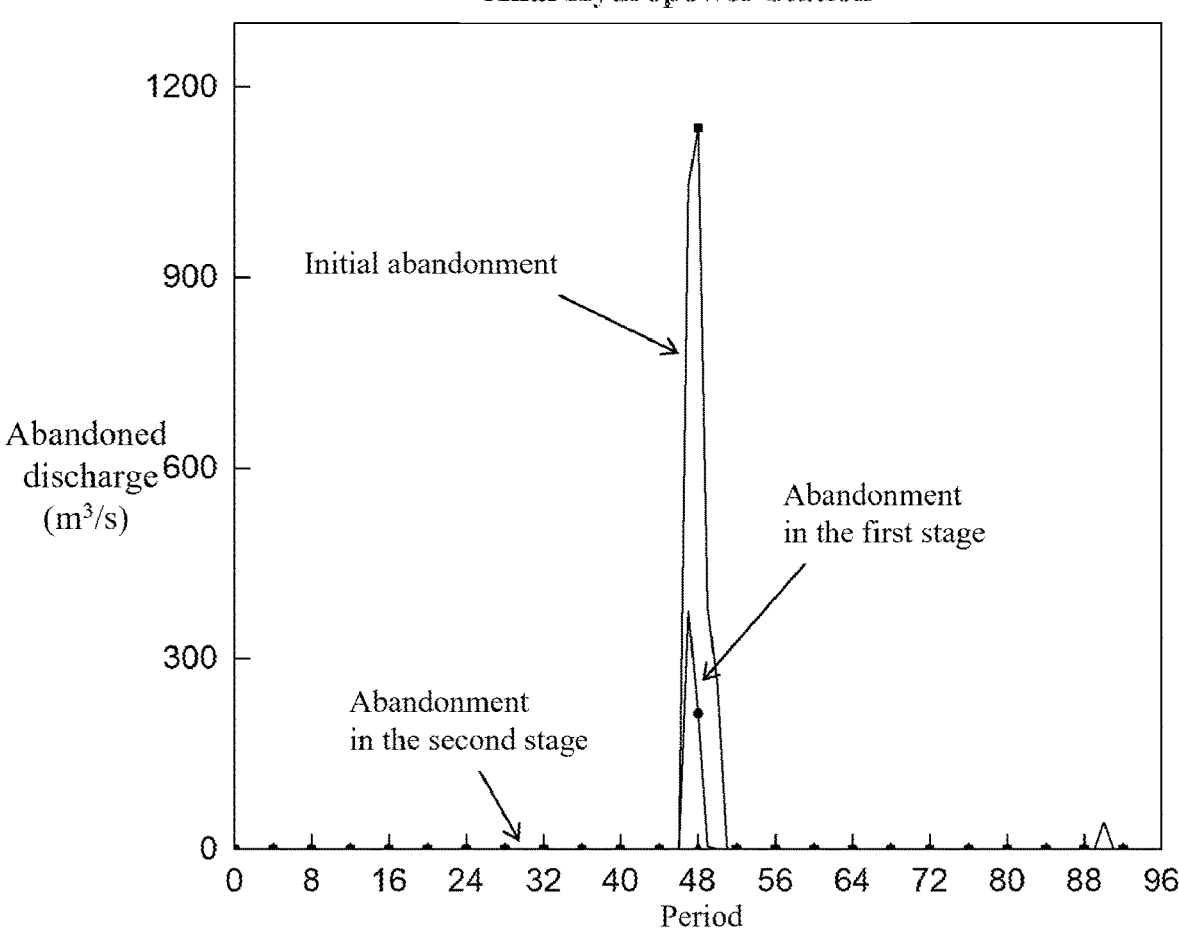
FIG. 4(*a*)~FIG. 4(*b*) A schematic diagram for the spillage profile of Ahai under different clearing stages.
Figure 4B:
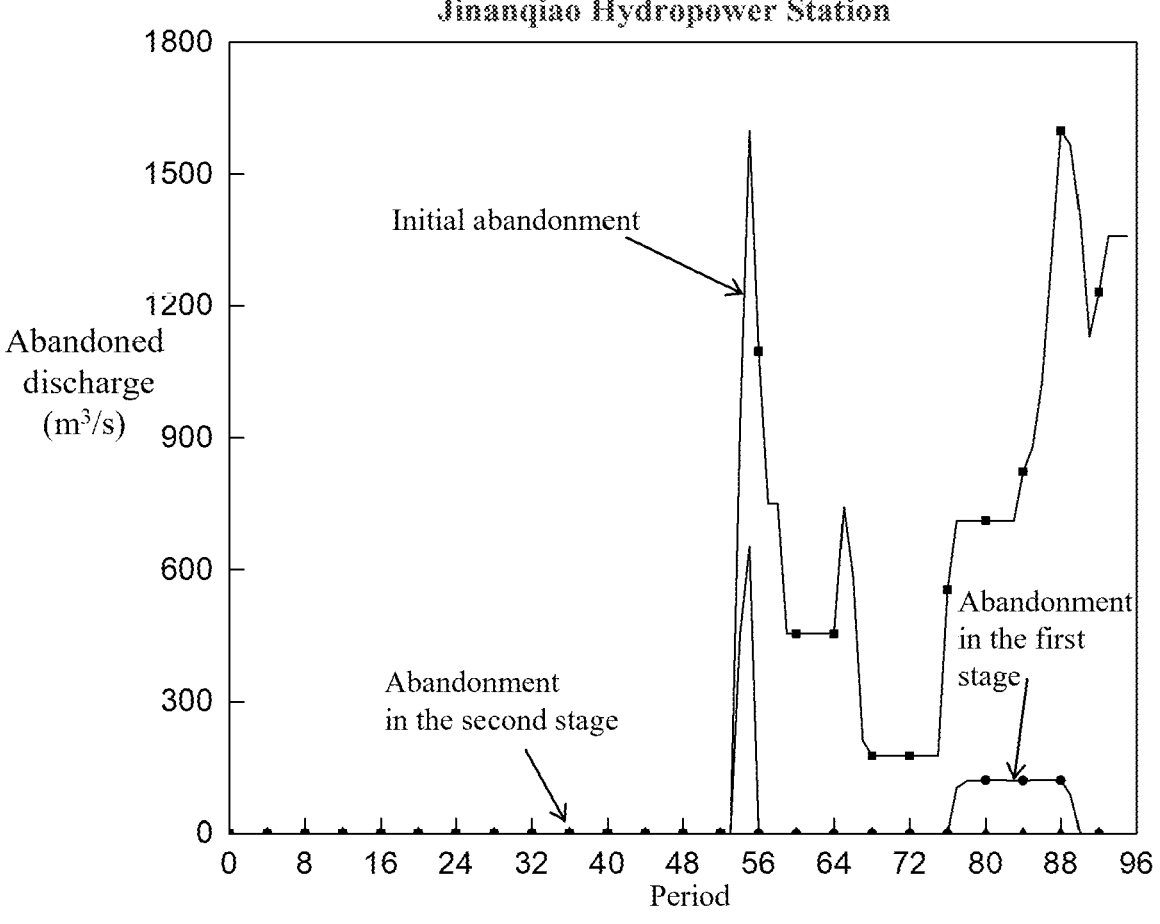

Since there exists spillage in the clearing results from the first round of iterative calculations, the spillage adjustment strategy in the invention is implemented sequentially. FIG. 4(a)~FIG. 4(b) show the process of spillage of some power stations under different clearing stages, and Table 3 shows the spillage adjustment in different stages. As can be seen from the figures, through the first stage of spillage adjustment to reduce the original price of the power station, the spillage problem has been greatly alleviated by giving it the priority to the qualification of clearing. The total spillage of the cascaded hydropower stations reduced to 288.9 million m³, a decrease of 98%. The spillage problems of Ahai and Guanyinyan have been completely solved. The second stage of spillage adjustment further reduced the spillage by controlling the generation of the upstream power station and reducing the inflow of the downstream power station during the corresponding time period, and the total spillage of the cascaded hydropower stations reduced to 0 m³. The results indicate that the invention can alleviate or even avoid the competitive spillage problem caused by independent bidding for the cascaded hydropower stations, and promote efficient utilization of the hydropower resources.

TABLE 3

| Treatment of wastewater at different stages | | | | | |
| Power station | Dawn Initial water | Phase i disposal of wastewater | | Phase ii treatment of wastewater | |
| | disposed volume/ten thousand m³ | Disposed water volume/ten thousand m³ | Degree of reduction | Disposed water volume/ten thousand m³ | Degree of reduction |
| --- | --- | --- | --- | --- | --- |
| Lidi | 257.7 | 53.5 | 79.3% | 0 | 100% |
| Ahai | 6917.2 | 0 | 100% | 0 | |
| Jin'anqiao | 2822.9 | 235.4 | 91.7% | 0 | 100% |
| Guanyinyan | 4820.7 | 0 | 100% | 0 | |
| total | 14848.6 | 288.9 | 98% | 0 | 100% |

Figure 5A:
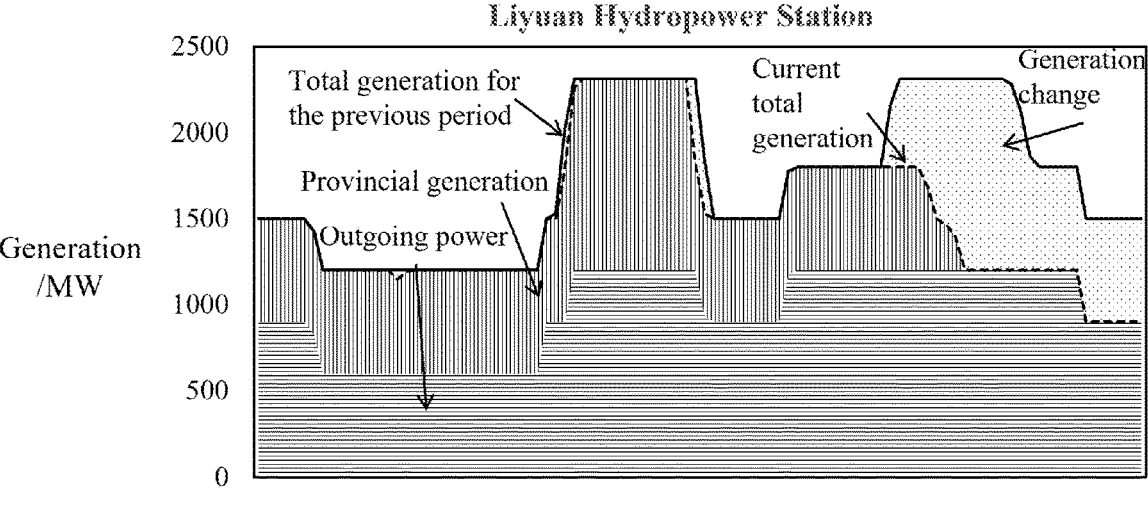
FIG. 5(*a*) A process diagram of the outgoing power of Liyuan after the first stage of spillage adjustment.
Figure 5B:
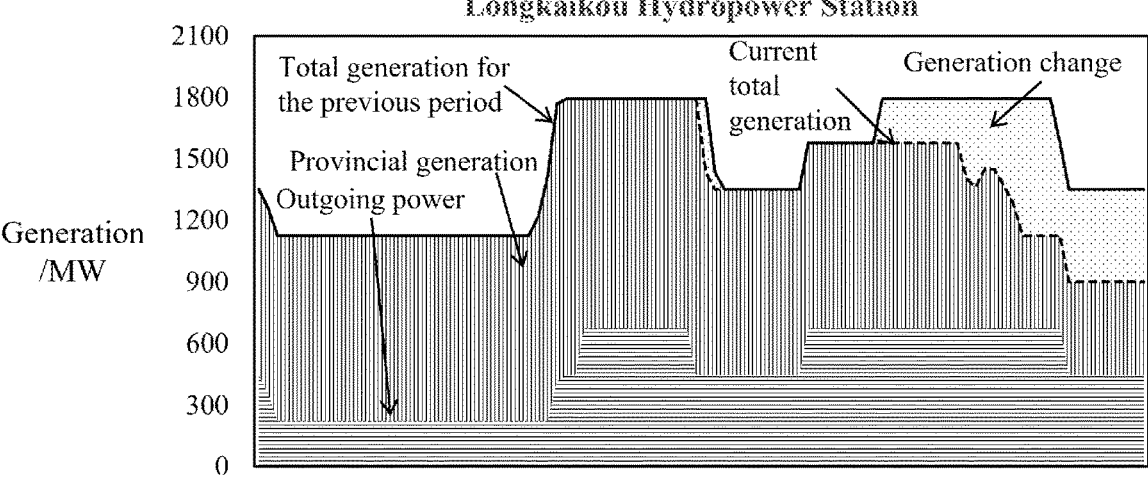
Figure 6A:
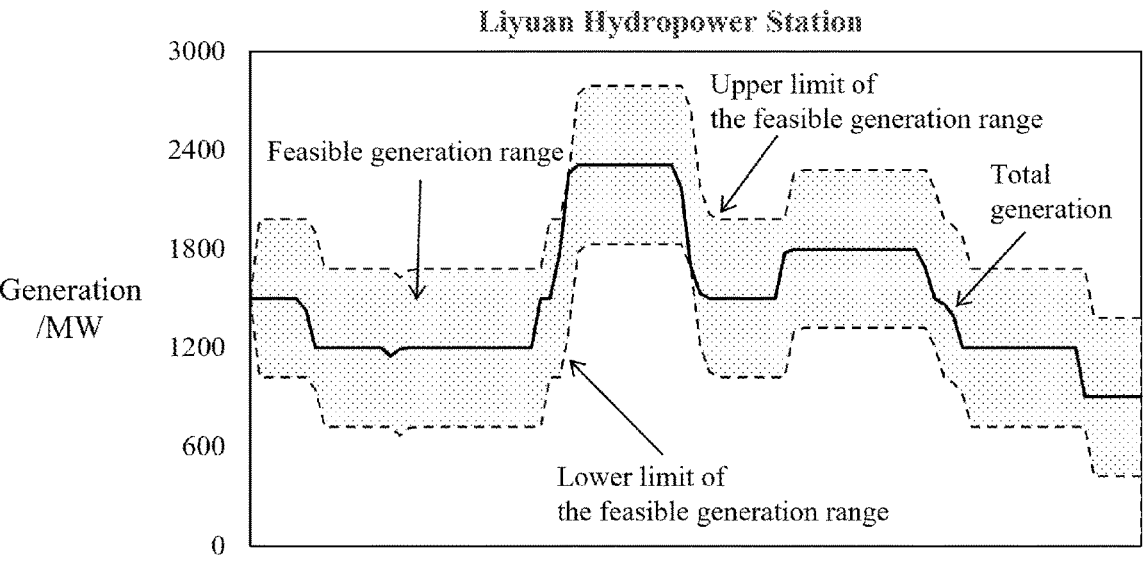
FIG. 6(*a*) A process diagram of the feasible generation interval and generation profile of Liyuan after the second stage of spillage adjustment.
Figure 6B:
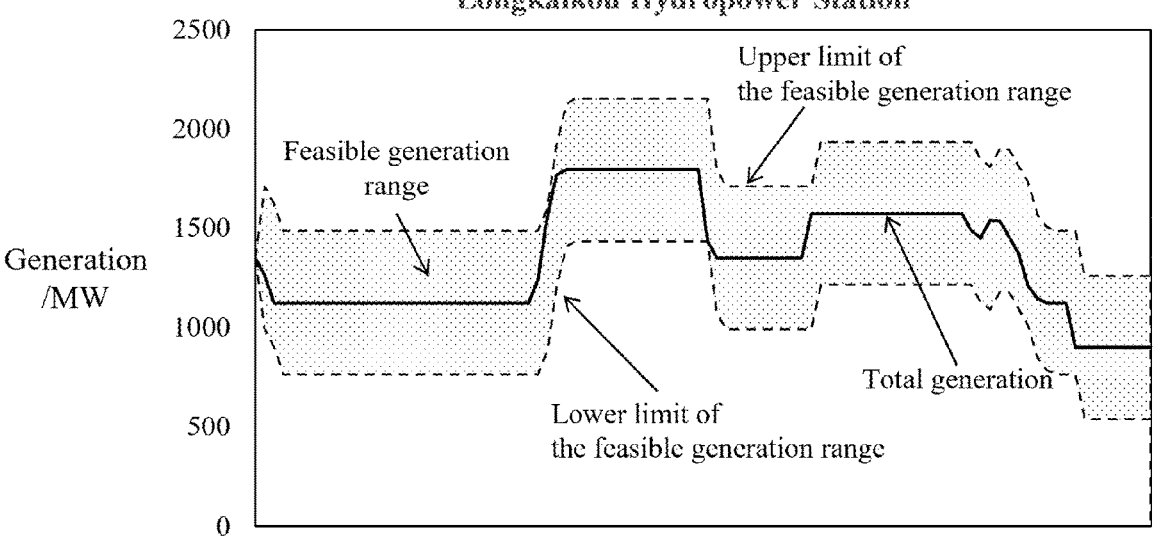

The convergence effect of Market clearing results and DC transmission plan: FIG. 5(a)~FIG. 5(b) show the generation profile of some power stations after the first stage of spillage adjustment. In order to improve the utilization efficiency of hydropower resources and furthest solve the spillage problem, the first stage of spillage adjustment gives priority qualification of clearing to the spillage, which leads to a large amount of low-priced electricity flooding into the sending end of market. At the same time, in order to ensure the load balance, the bided power of other power stations will inevitably be reduced to varying degrees. It can be seen that Liyuan, Longkaikou and other power stations in the province have different degrees of reduction of bided power. However, their outgoing processes are not been affected. FIG. 6(a)~FIG. 6(b) shows the feasible generation interval and generation profile of some power stations after the second stage of spillage adjustment. It can be seen that the overall generation profile of the power stations is located in the feasible interval, and the generation is close to the generation boundary in part of the time, but no overrun occurs, which effectively ensures the smooth implementation of the bided power plan of each power station in the sending and receiving ends. From the above analysis, the invention is able to realize the effective connection between the spot clearing results and the inter-provincial DC transmission plan, and guarantee the rationality of the multi-market synergistic clearing.

In summary, the invention provides a practical method for large-scale hydropower cross-provincial consumption in southwest of China, which can better deal with the connection of cross-provincial day-ahead spot market and the complex hydropower characteristics of high-proportion hydropower system, greatly simplify the coupling clearing problem in cross-provincial day-ahead spot market, and promote efficient cross-provincial consumption of hydropower.

The invention claimed is:

1. A coordination method of electricity supply and recipient market day-ahead spot clearing considering hydropower absorption is characterized by the following steps:

(1) construct a day-ahead spot clearing model for electricity supply and recipient market with a goal of minimizing the total power purchase cost, as shown in Eq. (1); a constraint set of spillage is introduced to furthest solve a problem caused by spillage of a high-proportion hydropower system in a supply market, as shown in Eq. (2);

$$\min \sum_{t \in T} \sum_{i \in I} (c_{i,t}^p + c_{i,t}^u) + \sum_{t \in T} \sum_{s \in S} M(SD_{s,t}^+ + SD_{s,t}^-) \qquad (1)$$

$$\begin{cases} P_{i,t}^{in} \leq N_{i,t}^{spill}, \ (S_{i,t}^1 = \text{true}) \\ E_i \geq \dfrac{\sum_{t \in T}(Q_{i-1,t}^{out} + Q_{i,t}^{local}) - \Delta V_i}{W_i}, \ (S^1 = \text{true}) \\ P_{i,t} \leq N_{i,t}^{up}, \ (S_{i,t}^2 = \text{true}) \end{cases} \qquad (2)$$

where $$c_{i,t}^p$$

is an operating cost or a power station i at period t;

$$c_{i,t}^u$$

is a start-up cost of the power station i at period t; T is a set of time periods; I is a set of power stations participating in a provincial market; M denotes a penalization factor; S is a set of transmission channels;

$$SD_{s,t}^+$$

is a surplus capacity of a channel s at period t;

$$SD_{s,t}^-$$

is an insufficient capacity of the channel s at period t;

$$S_{i,t}^1 \text{ and } S_{i,t}^2$$

respectively represent indicators of spillage status in a first stage and the second stage, where true represents a generation of spillage of the power station i at period t, and false represents no spillage; $S^1$ represents a status of whether a spillage adjustment strategy has been implemented, where true means that the strategy has been carried out, and false is a default status at an initial stage;

$$N_{i,t}^{spill}$$

is an upper limit of a bided generation of the power station i at period t calculated by a spilled outflow; $E_i$ is a daily electricity generated by the power station i;

$$Q_{i-1,t}^{out}$$

is the spilled outflow from an upstream power station i−1 at period t;

$$Q_{i,t}^{local}$$

is a natural streamflow of the power station i at period t; $\Delta V_i$ is a maximum available storage capacity of the power station i; $W_i$ is an average daily water consumption rate for the power station i;

$$N_{i,t}^{up}$$

is an upper limit of generation for the power station i positioned upstream at period t;

$$P_{i,t}^{in}$$

is the bided generation in a province of the power station i at period t; $P_{i,t}$ is a total bided generation of the power station i at period t;

(2) based on clearing results of the recipient market and combining technical parameters of the hydropower, a scheduling boundary updating strategy is constructed to update a boundary of a spot trading of the outgoing hydropower; specific steps are as follows:

step 1. prepare the bided generation and start-up and shut-down sequence conditions for outgoing the hydropower in the recipient market;

step 2. determine the start-up and shut-down schedules of the hydropower in each trading session during the day, and update optimization boundaries of the start-up and shut-down schedules of the outgoing hydropower in the recipient market according to Eq. (3):

$$v_{i,t}^{in} = \begin{cases} 1, \left(v_{i,t}^{out} = 1, \forall\, t \in T\right) \\ x, \left(v_{i,t}^{out} = 0, \forall\, t \in T\right) \end{cases} \tag{3}$$

where $$v_{i,t}^{out}$$

is a start-off state of the power station i at period t in the recipient market, and x represents an unknown start-off state of the power station i at period t;

step 3. combining an outgoing hydropower start-off schedule and generation profile, generating and ramping capability boundaries of the outgoing hydropower for corresponding periods are updated according to Eq. (4) and Eq. (5);

$$\begin{cases} \overline{P}_{i,t}^{in} = N_{i,t}^{max} - P_{i,t}^{out}, \left(\overline{P}_{i,t}^{in} \le \overline{N}_i\right) \\ \underline{P}_{i,t}^{w} = \lambda_{i,t}^{min} - P_{i,t}^{out}, \left(\underline{P}_{i,t}^{in} \ge 0\right) \end{cases} \tag{4}$$

$$\begin{cases} RU_{i,t}' = RU_i - P_{i,t}^{out} + P_{i,t-1}^{out} \\ RD_{i,t}' = RD_i - P_{i,t}^{out} + P_{i,t-1}^{out} \end{cases} \tag{5}$$

where $$\overline{P}_{i,t}^{in} \text{ and } \underline{P}_{i,t}^{in}$$

are maximum and minimum generation boundaries of the power station i in the province at period t, respectively;

$$N_{i,t}^{max} \text{ and } N_{i,t}^{min}$$

are maximum and minimum technical generation of the power station i at the period t, respectively;

$$P_{i,t}^{out}$$

is an outgoing generation of the power station i at period t; $\overline{N}_i$ is an installed capacity of the power station i; $RU'_{i,t}$ and $RD'_{i,t}$ are maximum upward and downward ramping rate boundaries for the power station i at period t, respectively; $RU_i$ and $RD_i$ are original maximum upward and downward ramping capacities of the power station i, respectively;

step 4. based on the generation profile of a cross-provincial hydropower, a daily power boundary of the outgoing hydropower is updated by Eq. (6) to ensure a precise matching of the electricity and water volume of each power station;

$$\begin{cases} E_i^{in} \le E_i^{self,max} - \lambda \sum_{t \in T} P_{i,t}^{out}, \, i \in \xi \\ E_i^{in} \le K \times E_{i-1} + E_i^{self,max} - \lambda \sum_{t \in T} P_{i,t}^{out} \end{cases} \tag{6}$$

where $$E_i^{in}$$

is a bided electricity of the power station i in the province, $$E_i^{self,max}$$

is a maximum daily electricity of the power station i; K is a conversion factor for upstream and downstream daily electricity; $\xi$ is a set of serial numbers for a first stage of cascaded hydropower stations; $\lambda$ is a conversion factor that converts a 15-min average generation to hourly electricity;

step 5. update the boundaries related to the outgoing hydropower in the day-ahead spot-clearing model for the supply market and organize clearing;

(3) to achieve coordinated clearing of the supply and recipient market as well as dynamic adjustment of the outgoing hydropower, an update strategy for the DC transmission plan is constructed taking the spillage adjustment strategy and cross-section power adjustment in supply market as input;

step 1. enter an outgoing plan and the results of the clearing of the supply market; Then check the process of the outgoing hydropower;

Step 2. update the boundaries of the outgoing hydropower for power stations that fail to reach a target generation based on Eq. (7), to solve a problem that an outgoing plan cannot be completed as promised owing to insufficient hydropower generating capability;

$$\overline{E}_i^{out} = E_i^{out} - E_i^{short} \tag{7}$$

where $$\overline{E}_i^{out}$$

is a maximum outgoing electricity of the power station i;

$$E_i^{out}$$

is a planned outgoing electricity of the power station i;

$$E_i^{short}$$

is a short electricity compared to the plan of the power station i;

Step 3. update boundaries of the upstream power station's outgoing plan based on Eq (8) to deal with a reduction in outgoing electricity of the upstream power station due to the spillage adjustment;

$$\overline{P}_{i,t}^{out} = P_{i,t}^{out} - N_{i,t}^{spill}, (\forall\, t \in T) \tag{8}$$

where $$\overline{P}_{i,t}^{out}$$

is an upper limit of the outgoing power of the power station i at period t;

$$P_{i,t}^{out}$$

is a planned generation of the power station i at period t;

$$N_{i,t}^{spill}$$

is a reduction in outgoing power of the power station i at period t due to the spillage adjustment strategy;

step 4. update the boundaries of the outgoing plan based on results of the insufficient capacity in supply market, as shown in Eq (9):

$$\overline{P}_{s,t}^{out} = P_{s,t}^{out} - SD_{s,t}^{+} + SD_{s,t}^{-} \tag{9}$$

where $$\overline{P}_{s,t}^{out}$$

is an upper limit of the outgoing power of the channel s at period t;

$$P_{s,t}^{out}$$

is a planning generation of the channel s at period t;

step 5. update the outgoing boundaries of the recipient market in the day-ahead spot clearing model and reorganize the clearing process, then return to step 2.

\* \* \* \* \*